(12) United States Patent
Asti et al.

(10) Patent No.: US 8,882,438 B2
(45) Date of Patent: Nov. 11, 2014

(54) METHODS AND SYSTEMS FOR VARIABLE GEOMETRY INLETS NOZZLES FOR USE IN TURBOEXPANDERS

(75) Inventors: Antonio Asti, Padua (IT); Alberto Scotti Del Greco, Figline Valdarno (IT); Paolo Del Turco, Impruneta (IT); Alessio Miliani, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 715 days.

(21) Appl. No.: 13/113,616

(22) Filed: May 23, 2011

(65) Prior Publication Data
US 2011/0305556 A1    Dec. 15, 2011

(30) Foreign Application Priority Data
May 24, 2010 (IT) .............................. CO2010A0029

(51) Int. Cl.
| | |
|---|---|
| F02C 9/20 | (2006.01) |
| F01K 23/10 | (2006.01) |
| F01D 17/16 | (2006.01) |
| F02C 9/24 | (2006.01) |
| F01K 7/04 | (2006.01) |
| F02C 6/18 | (2006.01) |
| F01K 25/10 | (2006.01) |

(52) U.S. Cl.
CPC .............. *F01D 17/165* (2013.01); *F01K 23/10* (2013.01); *F05D 2240/12* (2013.01); *F02C 9/24* (2013.01); *F01K 7/04* (2013.01); *F02C 9/20* (2013.01); *F02C 6/18* (2013.01); *F01K 25/10* (2013.01); *F05D 2220/40* (2013.01); *F05D 2240/40* (2013.01); *F05D 2270/3011* (2013.01)
USPC .................................. 415/1; 415/13; 415/162

(58) Field of Classification Search
USPC .............. 415/1, 13, 149.1, 149.2, 149.4, 151, 415/155, 162
See application file for complete search history.

(56) References Cited

U.S. PATENT DOCUMENTS

| | | | |
|---|---|---|---|
| 3,588,270 A * | 6/1971 | Boelcs ............................. | 15/162 |
| 4,028,884 A | 6/1977 | Martz et al. | |

(Continued)

FOREIGN PATENT DOCUMENTS

| | | |
|---|---|---|
| EP | 1362984 A2 | 11/2003 |
| GB | 2133839 A | 8/1984 |
| WO | 2007088194 A2 | 8/2007 |

OTHER PUBLICATIONS

Italian Search Report issued in connection with IT Application No. ITCO20100029, Jan. 20, 2011.

*Primary Examiner* — Edward Look
*Assistant Examiner* — Christopher R Legendre
(74) *Attorney, Agent, or Firm* — GE Global Patent Operation (57) ABSTRACT

A method and system for power generation including a turboexpander with at least two expansion stages, the turboexpander being connected to a power generation unit, is provided. The system includes a controller configured to control (i) an angle of a first inlet guide vane provided at an inlet of a first expansion stage of the turboexpander for maintaining an inlet pressure of the first expansion stage in a predetermined range, and (ii) an angle of a second inlet guide vane provided at an inlet of a second expansion stage of the turboexpander. The controller is configured to determine a highest power from determined powers of the power generation unit and a corresponding angle of the second inlet guide vane and to adjust the angle of the second inlet guide vane independent of the angle of the first inlet guide vane to achieve the highest power.

17 Claims, 10 Drawing Sheets

(56) References Cited

U.S. PATENT DOCUMENTS

| | | | |
|---|---|---|---|
| 4,660,375 A * | 4/1987 | Hyde et al. | 60/773 |
| 4,874,287 A * | 10/1989 | Grieb | 415/149.2 |
| 5,851,104 A | 12/1998 | Dakin et al. | |
| 5,993,152 A * | 11/1999 | Schilling | 415/160 |
| 6,332,313 B1 * | 12/2001 | Willis et al. | 60/776 |
| 6,422,014 B1 * | 7/2002 | Gladden | 60/602 |
| 6,793,456 B2 * | 9/2004 | Kotani et al. | 415/1 |
| 6,865,891 B2 * | 3/2005 | Walsh et al. | 60/792 |
| 7,273,346 B2 * | 9/2007 | Bouru | 415/162 |
| 7,315,778 B1 * | 1/2008 | Kumar et al. | 701/104 |
| 7,322,790 B2 * | 1/2008 | Bouru | 415/162 |
| 7,422,414 B2 * | 9/2008 | Fujii et al. | 415/1 |
| 2004/0088982 A1 | 5/2004 | Brasz et al. | |
| 2007/0031238 A1 | 2/2007 | Fujii | |
| 2008/0243352 A1 * | 10/2008 | Healy | 701/100 |
| 2011/0016876 A1 * | 1/2011 | Cataldi et al. | 60/773 |
| 2011/0142602 A1 * | 6/2011 | Adhami et al. | 415/159 |
| 2011/0305556 A1 * | 12/2011 | Asti et al. | 415/1 |
| 2013/0031902 A1 * | 2/2013 | Erdmenger et al. | 60/605.1 |

* cited by examiner

METHODS AND SYSTEMS FOR VARIABLE GEOMETRY INLETS NOZZLES FOR USE IN TURBOEXPANDERS

BACKGROUND OF THE INVENTION

1. Field of the Invention

The embodiments of the subject matter disclosed herein generally relate to power generation systems and more particularly to turboexpanders.

2. Description of the Prior Art

Figure 1:
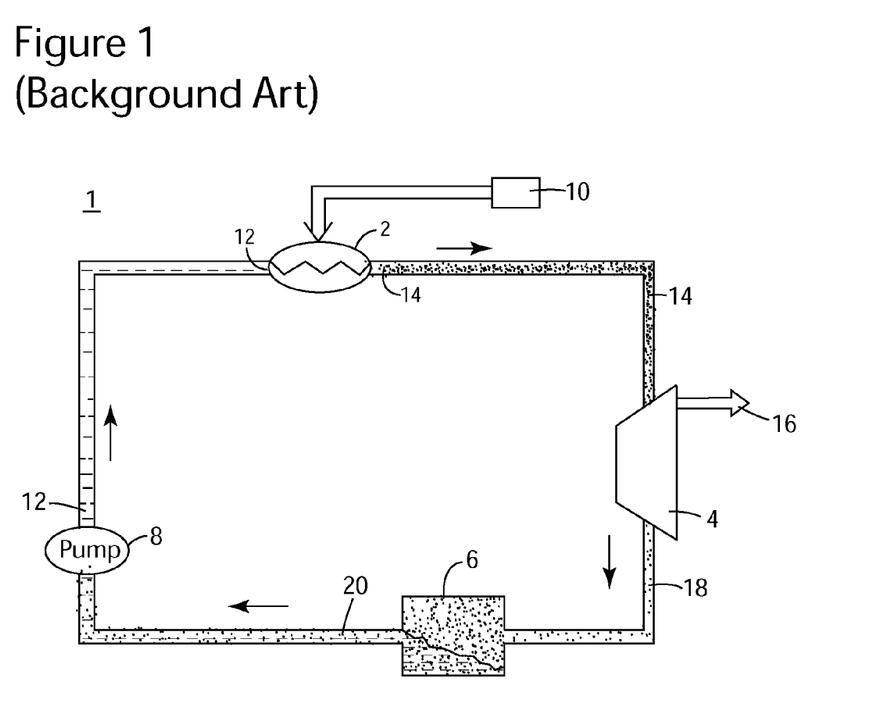
FIG. 1 depicts a Rankine cycle.

Rankine cycles use a working fluid in a closed-cycle to gather heat from a heating source or a hot reservoir and to generate a hot gaseous stream that expands through a turbine to generate power. The expanded stream is condensed in a condenser by transferring heat to a cold reservoir and pumped up to a heating pressure again to complete the cycle. Power generation systems such as gas turbines or reciprocating engines (primary system) produce hot exhaust gases that are either used in a subsequent power production process (by a secondary system) or lost as waste heat to the ambient. For example, the exhaust of a large engine may be recovered in a waste heat recovery system used for production of additional power, thus improving the overall system efficiency. A common waste heat power generation system operating in a Rankine cycle is shown in FIG. 1.

The power generation system 1 includes a heat exchanger 2, also known as a boiler or evaporator, a turboexpander 4, a condenser 6 and a pump 8. In operation, beginning with the heat exchanger 2, an external heat source 10, e.g., hot flue gases, heats the heat exchanger 2. This causes the received pressurized liquid medium 12 to turn into a pressurized vapor 14, which flows to the turboexpander 4. The turboexpander 4 receives the pressurized vapor stream 14 and can generate power 16 as the pressurized vapor expands. The expanded lower pressure vapor stream 18 released by the turboexpander 4 enters the condenser 6, which condenses the expanded lower pressure vapor stream 18 into a lower pressure liquid stream 20. The lower pressure liquid stream 20 then enters the pump 8, which both generates the higher pressure liquid stream 12 and keeps the closed-loop system flowing. The higher pressure liquid stream 12 then flows in to the heat exchanger 2 to continue this process.

One working fluid that can be used in a Rankine cycle is an organic working fluid. Such an organic working fluid is referred to as an organic Rankine cycle (ORC) fluid. ORC systems have been deployed as retrofits for engines as well as for small-scale and medium-scale gas turbines, to capture waste heat from the hot flue gas stream. This waste heat may be used in a secondary power generation system to generate up to an additional 20% power on top of the power delivered by the engine producing the hot flue gases alone.

Because of the concern that such hydrocarbon fluids can degrade and/or ignite if exposed directly to the high-temperature (~500 degrees Celsius) gas turbine exhaust stream, measures need to be taken to limit the surface temperature of the heat exchanging surfaces in an evaporator which contains the ORC working fluids. A currently used method for limiting the surface temperature of the heat exchanging surfaces in an evaporator which contains the ORC working fluids is to introduce an intermediate thermo-oil loop into the heat exchange system, i.e., to avoid the ORC liquid circulating through the exhaust stack of the gas turbine. The intermediate thermo-oil loop can thus be used as part of an intermediate heat exchanger between the hot flue gas and the vaporizable ORC fluid.

Figure 2:
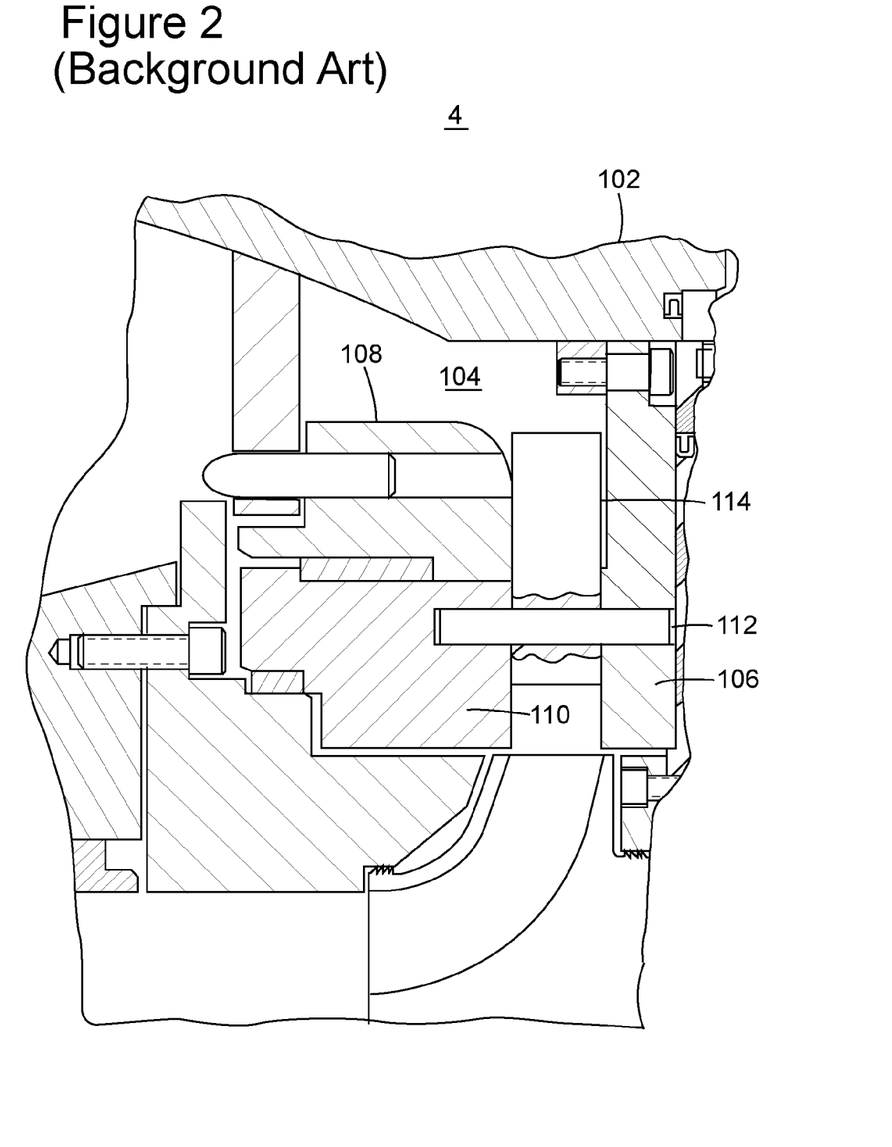
FIG. 2 shows a variable nozzle arrangement in a radial inflow turbine.
Figure 3:
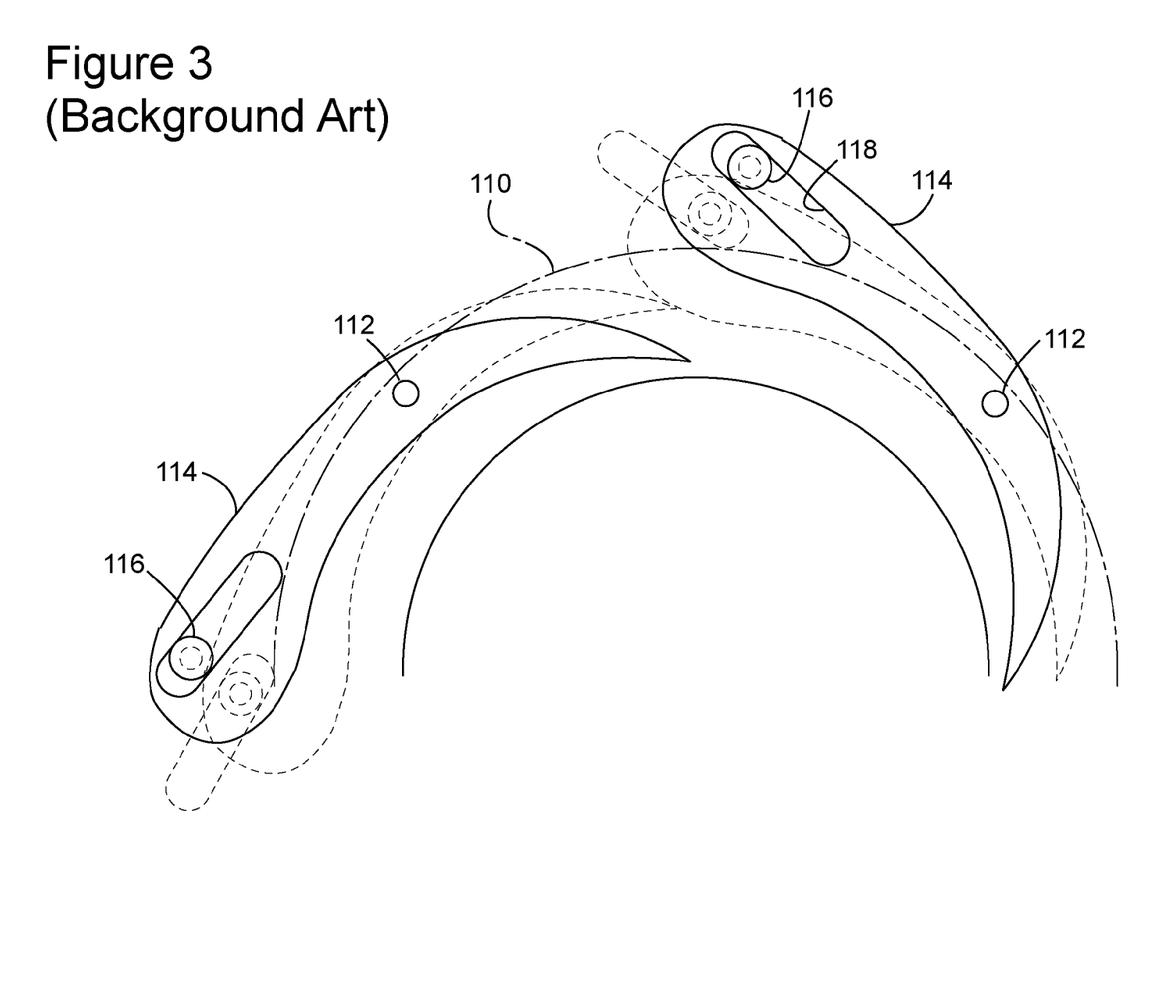
FIG. 3 shows the relative position of vanes with respect to a clamping ring in a turboexpander.

As described above, the turboexpander 4 is used in a power generation system. The turboexpander 4 can be a centrifugal or axial flow turbine through which a high-pressure gas is expanded to produce work which can be used to generate power. An example of portions of a turboexpander 4 is shown in FIGS. 2 and 3, which are reproduced from U.S. Pat. No. 5,851,104(the '104 patent) the entire content of which is incorporated herein by reference. FIG. 2 shows a variable nozzle arrangement in a radial inflow turbine. The radial inflow turbine has a housing 102 with an annular inlet 104. A fixed circular plate 106 is positioned to one side of the annular inlet 104. The nozzle adjustment system is provided to the other side of the annular inlet 104. An adjusting ring 108 is arranged radially outwardly of a clamping ring 110. The adjusting ring 108 is able to rotate about the clamping ring 110 which is prevented from rotating by nozzle pivot pins 112 anchored in the fixed circular plate 106.

Vanes 114 are located about the annular inlet 104. These vanes are positioned between the fixed circular plate 106 on one side and the clamping ring 110 and adjusting ring 108 on the other. The vanes 114 are configured to provide a streamlined flow path there between. This path may be increased or decreased in cross-sectional area based on the rotational position of the vanes 114. The vanes 114 are pivotally mounted about the nozzle pivot pins 112. The relative positioning of the vanes 114 with respect to the clamping ring 110 is illustrated by the superimposed phantom line in FIG. 3.

In the '104 patent, the nozzle adjusting mechanism includes a cam and cam follower mechanism. Cam followers 116 are displaced laterally from the axis of the pins 112 and are fixed by shafts in the vanes 114 as shown in FIG. 3. The cam followers 116 rotate about the shafts freely. To cooperate with the cam followers 116, cams in the form of biased slots 118 are arranged in the adjusting ring 108. They are sized to receive the cam followers 116 so as to allow for free-rolling movement as the adjusting ring 108 is rotated. This arrangement of the vanes 114, cam followers 116, biased slots 118 and the adjusting ring 108 make the opening of the vanes 114 linearly dependant on a rotation of the adjusting ring 108. So, by adjusting the vanes 114, the amount of fluid allowed into the turboexpander 4 can be controlled.

In some cases turboexpander 4 can have multiple expansion stages, with each stage having a set of inlet guide vanes 114 to control the fluid flow. However, controlling the vanes 114 in the multiple expansion stages can change various parameters in the power generation system which can lead to difficulties in conventional power generation systems, e.g., the inability to regulate system pressure while optimizing power output efficiency.

Accordingly, systems and methods for more efficiently operating a power generation system are desirable.

SUMMARY OF THE INVENTION

According to an exemplary embodiment there is a system for power generation including a turboexpander with at least two expansion stages, the turboexpander being connected to a power generation unit. The system includes a controller configured to control (i) an angle of a first inlet guide vane provided at an inlet of a first expansion stage of the turboexpander for maintaining an inlet pressure of the first expansion stage in a predetermined range, and (ii) an angle of a second inlet guide vane provided at an inlet of a second expansion stage of the turboexpander for maintaining the inlet pressure at the first expansion stage in the predetermined range. The controller is configured to vary the angle of the second inlet guide vane while maintaining fixed the angle of the first inlet guide vane and to determine a power generated by the power generation unit for corresponding varying angles. The controller is configured to determine a highest power from the determined power of the power generation unit and a corresponding angle of the second inlet guide vane and to adjust the angle of the second inlet guide vane independent of the angle of the first inlet guide vane to achieve the highest power.

According to another exemplary embodiment, there is a method for power generation including a turboexpander with at least two expansion stages, the turboexpander being connected to a power generation unit. The method includes a step of controlling (i) an angle of a first inlet guide vane in a first expansion stage of the turboexpander for maintaining an inlet pressure of the first expansion stage in a predetermined range, and (ii) an angle of a second inlet guide vane in a second expansion stage of the turboexpander for maintaining the inlet pressure at the first expansion stage in the predetermined range; a step of varying the angle of the second inlet guide vane while maintaining fixed the angle of the first inlet guide vane; a step of determining a power generated by the power generation unit for corresponding varying angles; a step of determining a highest power of the power generated by the power generation unit and a corresponding angle of the second inlet guide vane; and a step of adjusting the angle of the second inlet guide vane independent of the angle of the first inlet guide vane to achieve the highest power.

According to still another exemplary embodiment, there is a computer readable medium including computer executable instructions, where the instructions, when executed, implement a method for power generation including a turboexpander with at least two expansion stages, the turboexpander being connected to a power generation unit. The steps of the method are similar to those described in the previous paragraph.

BRIEF DESCRIPTION OF THE DRAWINGS

The accompanying drawings illustrate exemplary embodiments, wherein.

DETAILED DESCRIPTION OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As described in the Background, and shown in FIG. 1, a Rankine cycle can be used in power generation systems to capture a portion of the waste heat energy. According to exemplary embodiments, a turboexpander with multiple expansion stages can allow the power generation system to operate at an upper pressure (or within an upper desirable pressure range) while optimizing power output efficiency from, for example, a generator. An exemplary system for power generation (in which some components of a conventional Rankine system have been removed for simplicity and brevity) in which such an exemplary turboexpander will now be described with respect to FIG. 4. However, according to exemplary embodiments, the components described for a Rankine cycle and shown in FIG. 1 can be used in a similar power generation unit which uses the exemplary turboexpander and control system described below.

Figure 4:
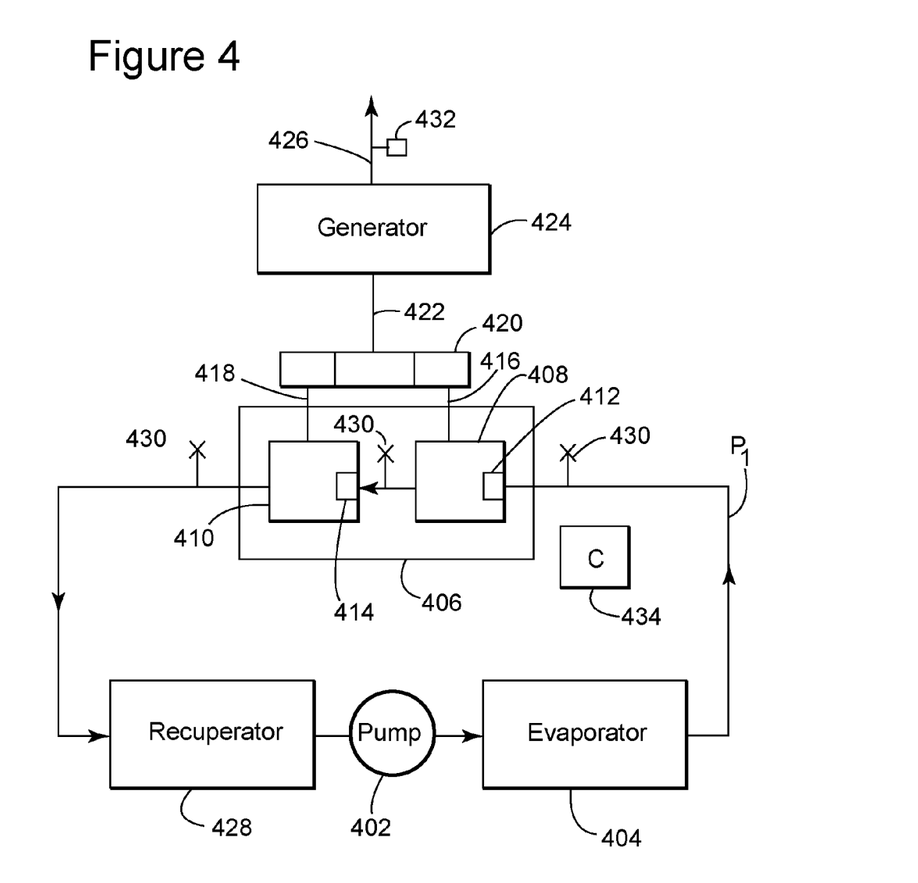
FIG. 4 illustrates a Rankine cycle according to exemplary embodiments.

Initially, the system is pressurized and the working fluid circulated (in the direction shown by the arrowheads) in the closed-loop Rankine cycle system by the pump 402. The working fluid, e.g., an ORC fluid, is pumped to the evaporator 404, where the working fluid is evaporated. This pressurized vapor then goes to the turboexpander 406 which has a first expansion stage 408 and a second expansion stage 410. In one application, multiple expanders (physically separated from each other) may be used instead of a single expander having multiple stages. The novel features discussed herein apply to both multiple expanders or a single expander with multiple stages. The first expansion stage 408 includes an inlet guide vane 412 which regulates an amount/rate of pressurized vapor entering the first expansion stage 408. The pressurized vapor expends some energy during expansion and travels on to the second expansion stage 410, entering the second expansion stage 410 through another inlet guide vane 414 which also regulates an amount/rate of vapor entering the second expansion stage 410.

As the vapor expands in the expansion stages 408 and 410, work is performed which rotates their respective shafts 416, 418 which are connected to a gear box 420. A single shaft 422 connects the gear box 420 to a generator 424. Power 426 is then output from the generator 424.

Returning to the Rankine cycle portion of FIG. 4, the expanded vapor leaves the second expansion stage 410 and exits the turboexpander 406 enroute to a recuperator 428 which allows for heat exchange of the working fluid. The working fluid then goes through other steps of the Rankine cycle (not shown) enroute to the pump 402 to repeat the cycle. Sensors 430 represent pressure monitoring sensors and sensor 432 represents one or more sensor(s) used to monitor power output efficiency (e.g., current and/or voltage sensors). Controller 434 controls settings of the power generation system.

Figure 5:
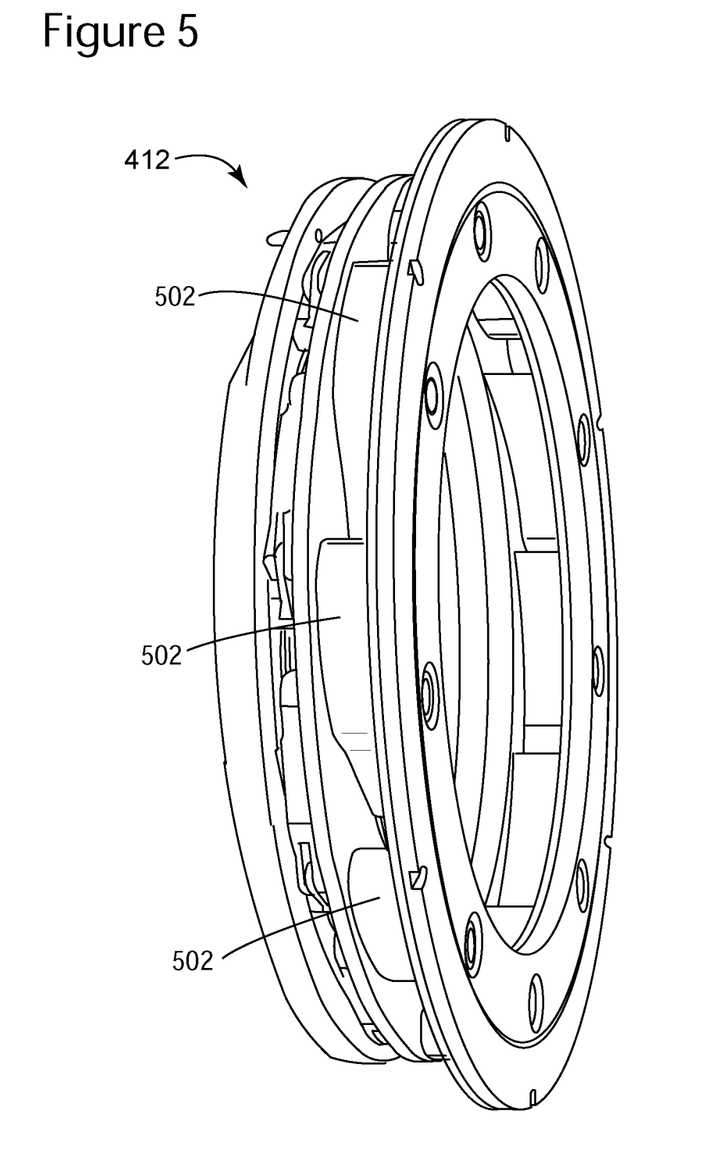
FIG. 5 shows an inlet guide vane section of an expansion stage of a turboexpander according to exemplary embodiments.
Figure 6:
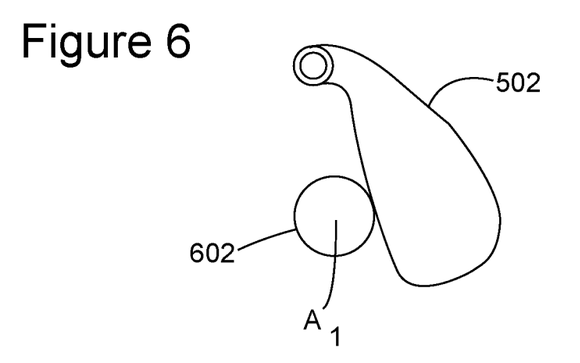
FIGS. 6-8 depict various positions of an inlet guide vane to a fluid opening according to exemplary embodiments.
Figure 7:
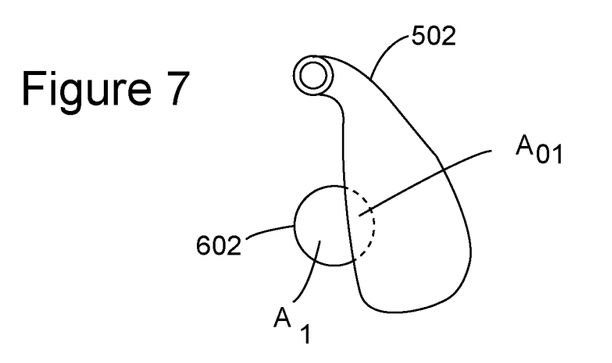
Figure 8:
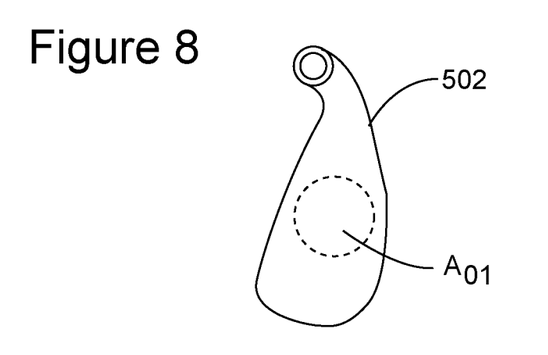

An example of an inlet guide vane 412 is shown in FIG. 5. Variable geometry inlet guide vanes 502 can be set to various positions or angles, which can be changed to control the flow of the working fluid into the expansion stage. Additionally, according to exemplary embodiments, by controlling the position of the vanes 502, the pressure P1 (shown in FIG. 4) can be regulated to be within an upper maximum range. For simplicity, FIGS. 6-8 show different positions of a single vane 502 in relation to a corresponding fluid inlet 602. $A_1$ represents the open area of the fluid inlet 602 and $A_{O1}$ represents the area of the fluid inlet 602 which is blocked by the variable geometry inlet guide vane 502. FIG. 6 shows a fully open fluid inlet 602, FIG. 7 shows a partially open fluid inlet 602 and FIG. 8 shows a fully blocked fluid inlet 602. While only three positions are shown in FIGS. 6-8, other angular positions of the vanes 502 are possible. Additionally, the various positions of the vanes 502 with respect to the fluid inlet 602 creates a variable geometry inlet nozzle for fluid entering the expansion sections of the turboexpander 406.

Figure 9:
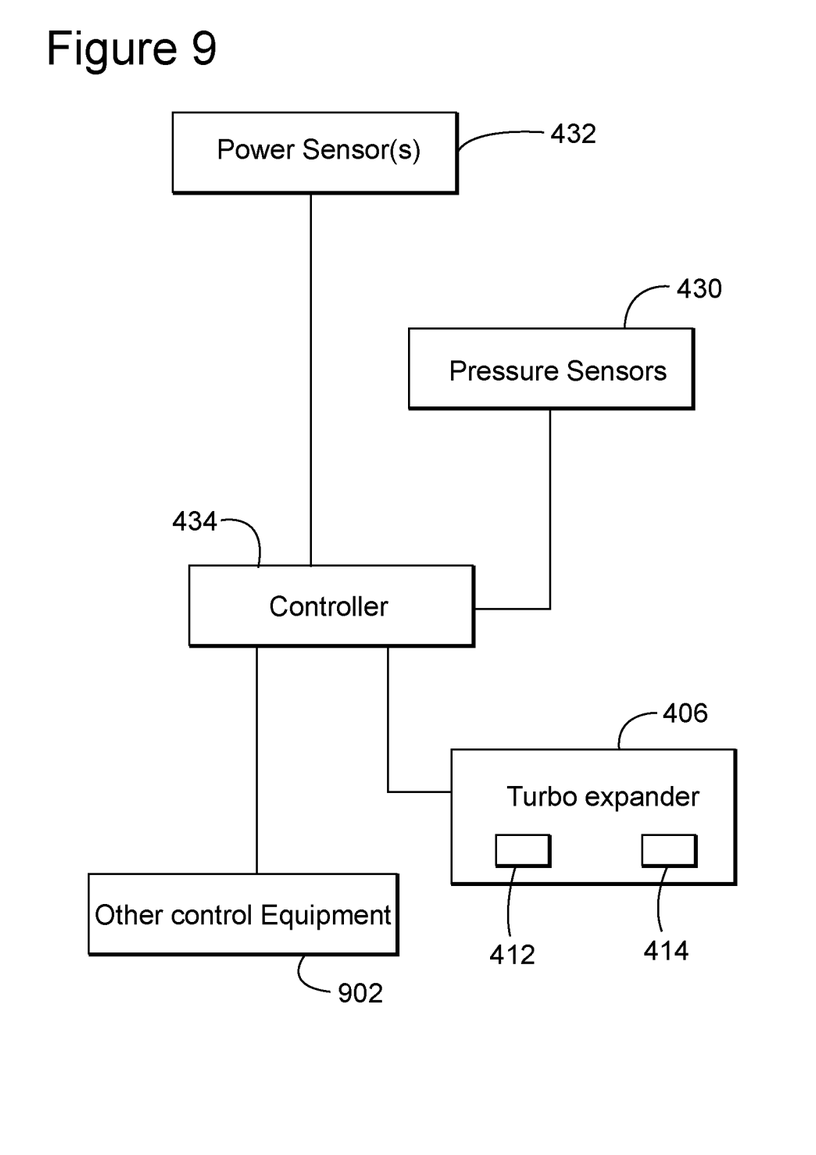
FIG. 9 shows elements of the control system according to exemplary embodiments.

According to exemplary embodiments, as described above, controller 434 can control settings, parameters, software and other controls associated with the power generation system. Various control elements and exemplary communication links are shown in FIG. 9, including controller 434. Other controls may include power sensor(s) 432 which can be used to gather current, voltage and/or other power-related information from an associated power generation unit, e.g., a generator. Pressure sensors 430 can be used to gather pressure data from various locations in the power generation cycle.

Other control equipment 902 as shown in FIG. 9 can also be used in the power generation system. These control elements can all be in communication with the controller 434, however other communication links can also exist, e.g., a backup communication link or other direct links between the control elements can be present. Controller 434 is also in communication with the turboexpander 406 and the controls for the inlet guide vane 412 and 414. This allows the controller 434 to issue instructions for changing the angle of the inlet guide vanes 412 and 414. While controller 434 is shown as a single unit, multiple controllers 434 can exist in the system with duties being spread out among the units as desired. Additionally, the exemplary embodiments described herein could be performed by a controller 434 which is integrated with another piece of equipment, e.g., the controls of the turboexpander 406.

Figure 10:
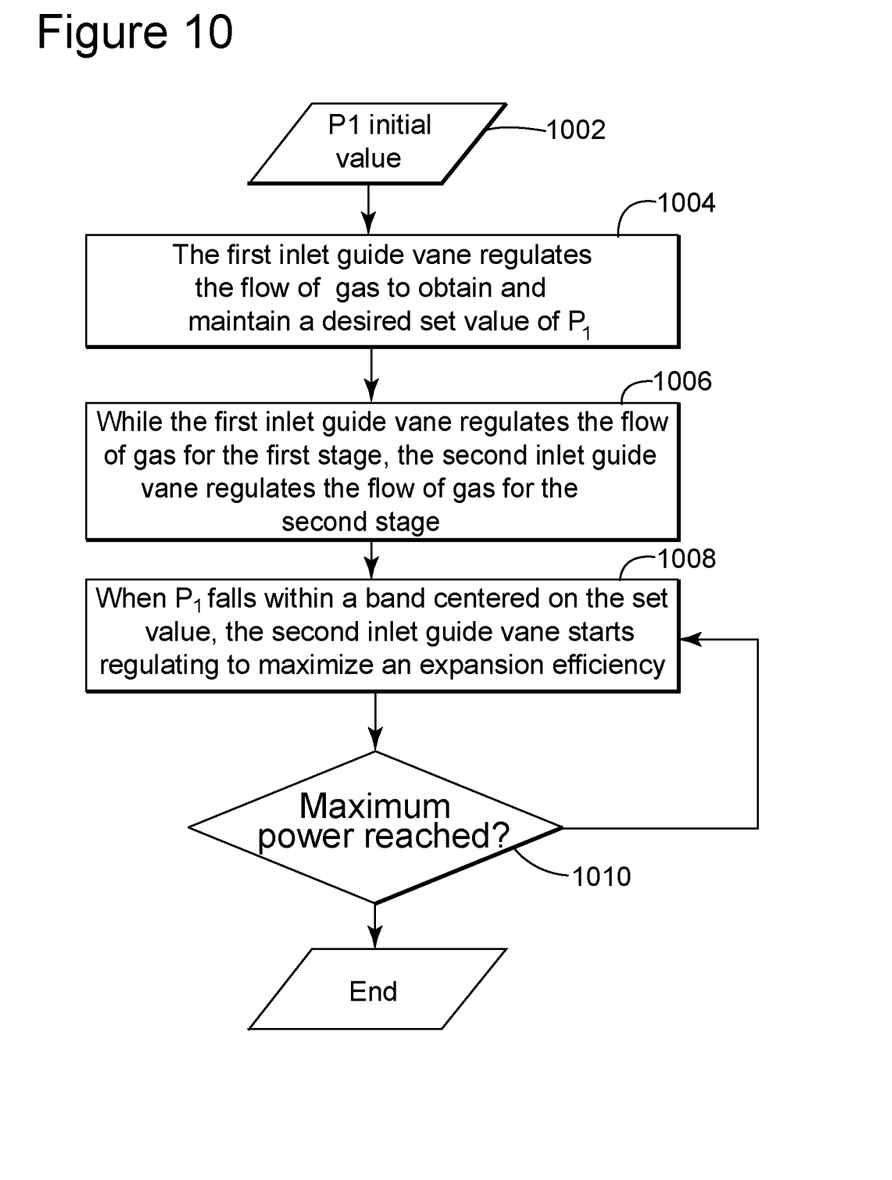
FIG. 10 shows a flowchart for a method of power generation according to exemplary embodiments.

According to exemplary embodiments, using the exemplary system and control elements described above, systems and methods can in a two-stage (or more) turboexpander have the first expansion stage regulate the upper pressure of a Rankine cycle within a pressure range such that a second expansion stage can regulate itself to automatically find the optimal expansion ratio associated with a maximum power output from, for example, the generator in the associated power generation system. According to exemplary embodiments, this exemplary process can be performed when the power generation system is operating with partial loads to improve the power output. As will be discussed later in more details, for certain conditions of the turboexpander (chocked conditions) an efficiency of the expander is directly proportional to a power output of the generator driven by the turboexpander. This process can be performed as shown in the flowchart of FIG. 10. Initially, the power generation system is operating and there is an initial value of the pressure P1 of the working fluid in step 1002 as it enters the inlet guide vane 412 of the first expansion stage of the turboexpander. The inlet guide vane 412 regulates the flow of gas to obtain and maintain a desired set value of P1, e.g., 50 bar, within a desirable range, e.g., a range of +/−1 or +/−0.5 bar, in step 1004.

According to exemplary embodiments, the inlet guide vane 412 is regulated, for example, by controller 434 to adjust the angle of the vanes to obtain the desired pressure P1 which may be determined or set for example, by plant optimal performance parameters. While the inlet guide vane 412 regulates the flow of gas for the first stage, the inlet guide vane 414 regulates the flow of gas for the second stage as shown in step 1006. The inlet guide vane 414 regulates the flow of gas in a manner described later so as to not disrupt system pressure while the inlet guide vane 412 is regulating the flow of gas. This prevents the inlet guide vane 412 from always changing the angle of the vanes to obtain and maintain the desired P1 value in the predetermined window. Once P1 falls within a band centered on the set value, the inlet guide vane 412 is fixed and the inlet guide vane 414 starts dynamically regulating the flow of gas through the second stage of the turboexpander to maximize an expansion efficiency of the turboexpander as shown in step 1008. This maximizing of the expansion efficiency is related to maximizing the power output of the associated generator 426. The expansion efficiency of the turboexpander, as used herein, is described in equation (1) below:

$$\text{Expansion Efficiency} = \text{Electrical Power Generation} / \text{Enthalpy Flow Rate} \quad (1)$$

with the Enthalpy Flow Rate becoming a constant when the inlet guide vane 412 is fixed and the turboexpander is choked. It is noted that when the turboexpander is choked, a constant mass flows through the device. For simplicity of calculations, both stages of the turboexpander are considered to be choked. As the enthalpy flow rate is constant under choked conditions, the expansion efficiency of the turboexpander is proportional to the electrical power generation of the associated generator.

Given the fact that the inlet guide vane 412 is fixed, the inlet guide vane 414 is controlled to sweep through various vane angles so that a power output of the power generation is varied. This power output is measured and in one application stored in a database. The controller 434 checks for the point of maximum power output by both sweeping up and sweeping down from the initial angular start point of the vanes in the inlet guide vane 414 and captures data for each vane position. According to an exemplary embodiment, this sweeping can occur in about 20 seconds, however other time frames can be used as desired. For each angular position of the vanes, the power output of the power generator 424 is determined as shown in step 1010. If the determination results in a non-maximum power reached, the process is repeated, otherwise the process ends with the inlet guide vane 414 vane angle becoming fixed. In one application, the controller 434 determines from the database which angle of the inlet guide vane 414 maximizes the power output of the power generator 424 and sets the angle of the inlet guide vane 414 accordingly. This sweeping process can be repeated and rechecked over time as desired. Additionally, if P1 falls out of the desired range due to system changes, e.g., the load changes which can affect temperature and pressure of the working fluid, the entire process shown in the flowchart of FIG. 10 can be repeated. In one application, if P1 falls out of the desired range, the inlet guide vane 414 is configured to abandon the angle that maximizes the efficiency of the turboexpander 406 and to follow the inlet guide vane 412 until the P1 is brought in the desired range.

According to exemplary embodiments, various algorithms can be used to describe the relationship between the inlet guide vane 412 and the inlet guide vane 414 for different stages of regulating their respective gas flows. Assumptions used in the algorithms described below include using a mach number of one and that the system is operating in a choked condition. According to an exemplary embodiment, when the inlet guide vane 412 first begins to regulate the gas flow (or just prior to it beginning to regulate the flow of gas) to enter the desired pressure range, the functional relationship between the two stages can be described as shown in equation (2):

$$A_2 = A_1 \cdot f(P_1, P_2, T_1, T_3), \quad (2)$$

where $A_1$ is the area of a fluid inlet not blocked by a vane at the inlet guide vane 412 (see FIG. 7), $A_2$ is the area of a fluid inlet not blocked by a vane at the inlet guide vane 414 (not shown but similar to $A_1$ in FIG. 7), $P_1$ is the pressure of the working fluid at the first inlet guide vane stage 412, $P_2$ is the pressure of the working fluid at the inlet guide vane 414, $T_1$ is the temperature of the working fluid at the inlet guide vane 412, and $T_2$ is the temperature of the working fluid at the inlet guide vane 414.

According to another exemplary embodiment, when the inlet guide vane 412 first begins to regulate (or just prior to it beginning to regulate) to enter the desired pressure range, the relationship between the two stages can be described as shown in equation (3):

$$\frac{A_1}{A_{t1}} = \frac{A_2}{A_{t2}}, \quad (3)$$

where $A_{t1}$ is the total area (see $A_1+A_{01}$ in FIG. 7) of a fluid inlet through a vane at the inlet guide vane 412 and $A_{t2}$ is the total area (not shown but similar to $A_{t1}$ in FIG. 7) of a fluid inlet through a vane at the inlet guide vane 414.

According to another exemplary embodiment, when the inlet guide vane 412 is regulating the flow of gas to enter the desired pressure range, the relationship between the inlet guide vane 412 and the inlet guide vane 414 is set up so that the inlet guide vane 414 practically does not influence the pressure of the flow of gas entering the inlet guide vane 412. For this situation, the inlet guide vane 414 is set to follow the inlet guide vane 412 based on equation (4):

$$A_2 = A_1 \cdot \frac{\rho_1}{\rho_2} \cdot \sqrt{\frac{T_1}{T_2}}, \quad (4)$$

where $\rho_1$ is the density of the working fluid at the inlet guide vane 412, and $\rho_2$ is the density of the working fluid at the inlet guide vane 414.

According to another exemplary embodiment, when the inlet guide vane 412 has regulated the flow of gas to have a pressure in the desired pressure range and the pressure is stable, the angle of the inlet guide vane 412 is fixed and only the angle of the inlet guide vane 414 is adjusted until the efficiency of the turboexpander 406 is maximized. Thus, the inlet guide vane 414 becomes independent of the inlet guide vane 12 and the area $A_2$ of the unblocked fluid inlet for the inlet guide vane 414 is described by equation (5):

$$A_2 = \frac{m}{\sqrt{k} \cdot \left(\frac{k+1}{2}\right)^{\frac{1}{2} \cdot \frac{(k+1)}{k-1}} \cdot \rho_2 \sqrt{R \cdot T_2}}, \quad (5)$$

wherein k is the isentropic coefficient of the gas, m is the working fluid mass flow rate and R is the gas constant. From this point, the inlet guide vane 414 can sweep up and down through various angles to determine the maximum power output point of the power generator 424 which, as described above, is associated with maximizing expansion efficiency of the turboexpander 406. This sweeping, as controlled by the controller 434 (or one of its associated control elements) is kept within a range so as to not allow $P_1$ to leave the predetermined range. However, if $P_1$ leaves the predetermined (desired) range, the sweeping process for the inlet guide vane 414 is suspended and the inlet guide vane 412 starts to regulate the flow of gas to bring $P_1$ to the predetermined range. The various values of the angles and the measured variables indicative of the expander efficiency for the inlet guide vane 414 may be stored in a memory. After the sweeping process is completed, the controller 434 may compare the stored values and select that value that maximizes the expansion efficiency of the turboexpander 406 and set the value of the inlet guide vane 414 to have the selected value.

According to an alternative exemplary embodiment, turboexpander 406 can have more than two expansion stages with at least one expansion stage regulating system pressure and another expansion stage maximizing power efficiency.

According to exemplary embodiments, by using the inlet guide vane 412 of the first expansion stage 408 to regulate pressure, there is no need for a dedicated valve to be in-line with the working fluid to control system pressure as the working fluid enters the first expansion stage 408. Additionally, exemplary embodiments can be used in situations where the operating conditions of the power generation system change, e.g., partial loads and varying ambient temperatures.

According to exemplary embodiments, one working fluid that can be used in a Rankine cycle is an ORC fluid. Examples of ORC fluids include, but are not limited to, pentane, propane, cyclohexane, cyclopentane, butane, a fluorohydrocarbon such as R-245fa, and a ketone such as acetone or an aromatic such as toluene or thiophene. However, as mentioned in the Background section, when directly exposed to high temperatures there is a risk of degradation of the ORC fluid. Therefore, according to exemplary embodiments, an intermediate thermo-oil loop or another fluid can be used in power generation systems which use the exemplary turboexpander 406.

Figure 11:
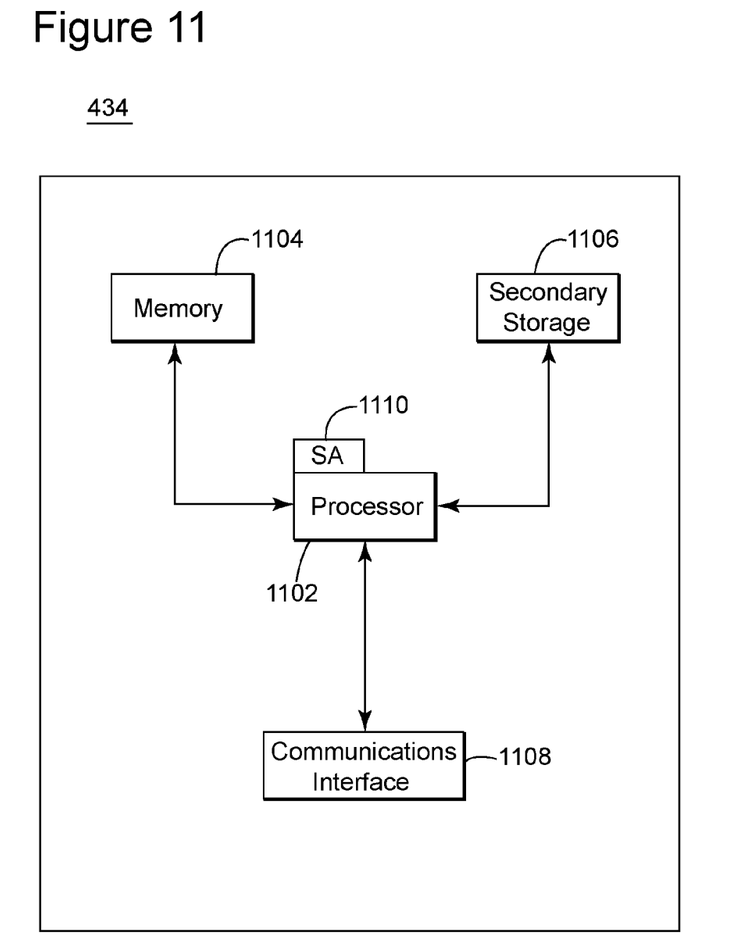
FIG. 11 depicts a device which can act as a controller of a power generation system according to exemplary embodiments.

The exemplary embodiments described above provide methods and systems for regulating an upper pressure in a Rankine cycle and then maximizing the power output efficiency of, for example, a generator 426. Controller 434 (as shown in FIG. 11) can contain a processor 1102 (or multiple processor cores), memory 1104, one or more secondary storage devices 1106, a communications interface 1108 and a software application 1110. Processor 1102 can execute instructions for performing exemplary embodiments as described herein. Additionally, the processor 1102 can include instructions for execution in support of operating and controlling a power generation system. Memory 1104 can store these instructions as well as sensor information and the results obtained from the sweeping of the vanes. Additionally, information associated with $P_1$ and the pressure range and the like can also be stored within the controller 434. The software application 1110 can represent programs associated with exemplary embodiments described herein as well as programs associated with the power generation system. The communications interface 1108 can communicate with sensors, other controllers and the like to operate the power generation system and transmit instructions associated with changing inlet guide vane angles. Accordingly, the exemplary embodiments described above can be controlled by controller 434.

Figure 12:
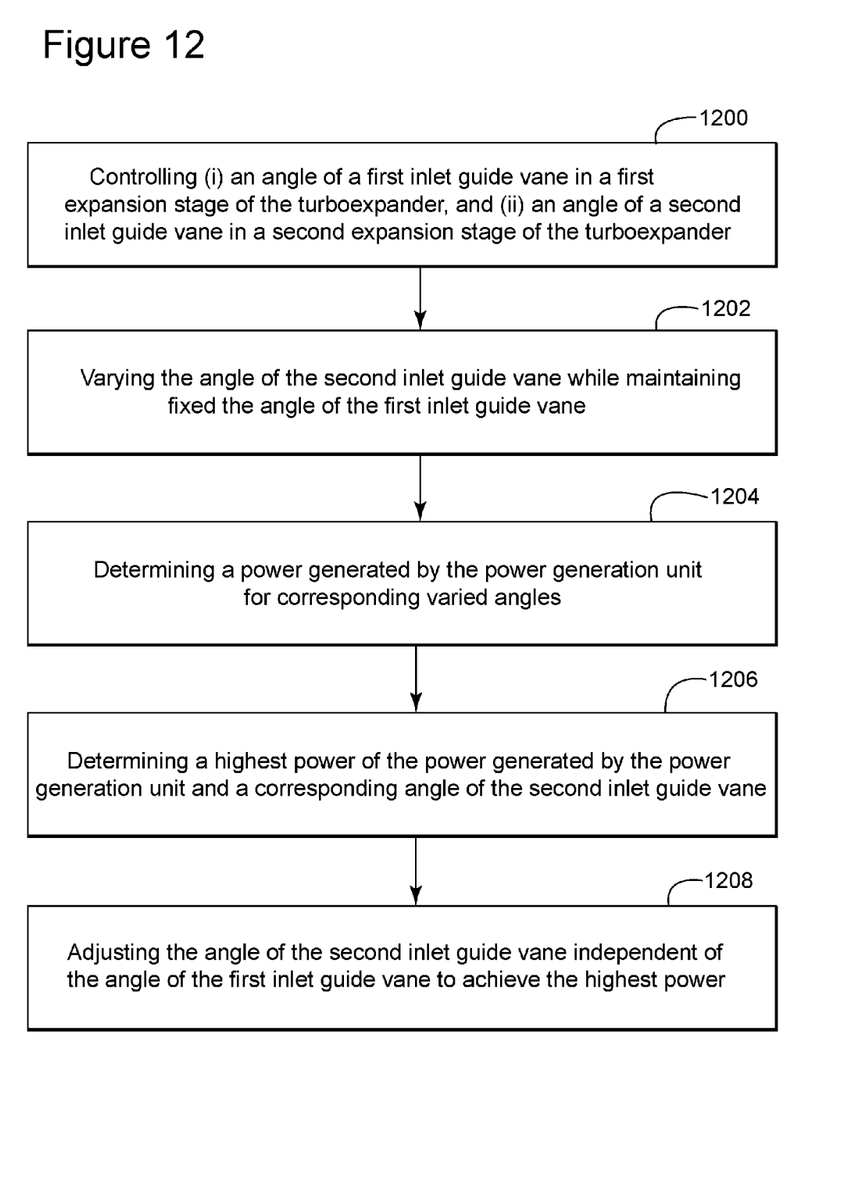
FIG. 12 shows another flowchart for a method of power generation according to exemplary embodiments.

According to exemplary embodiments, a method for power generation includes a turboexpander with at least two expansion stages as shown in the flowchart of FIG. 12. The method includes a step 1200 of controlling (i) an angle of a first inlet guide vane in a first expansion stage of the turboexpander for maintaining an inlet pressure of the first expansion stage in a predetermined range, and (ii) an angle of a second inlet guide vane in a second expansion stage of the turboexpander for maintaining the inlet pressure at the first expansion stage in the predetermined range; a step 1202 of varying the angle of the second inlet guide vane while maintaining fixed the angle of the first inlet guide vane; a step 1204 of determining a power generated by the power generation unit for corresponding varying angles; a step 1206 of determining a highest power of the power generated by the power generation unit and a corresponding angle of the second inlet guide vane; and a step 1208 of adjusting the angle of the second inlet guide vane independent of the angle of the first inlet guide vane to achieve the highest power.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A method for power generation including a turboexpander with at least two expansion stages, the turboexpander being connected to a power generation unit, the method comprising:

controlling (i) an angle of a first inlet guide vane in a first expansion stage of the turboexpander for maintaining an inlet pressure of the first expansion stage in a predetermined range, and (ii) an angle of a second inlet guide vane in a second expansion stage of the turboexpander for maintaining the inlet pressure at the first expansion stage in the predetermined range;

varying the angle of the second inlet guide vane while maintaining fixed the angle of the first inlet guide vane;

determining a power generated by the power generation unit for corresponding varying angles;

determining a highest power of the power generated by the power generation unit and a corresponding angle of the second inlet guide vane; and adjusting the angle of the second inlet guide vane independent of the angle of the first inlet guide vane to achieve the highest power.

2. The method of claim 1, wherein the power generation unit operates in a Rankine cycle system which uses an organic Rankine working fluid.

3. The method of claim 1, further comprising:

measuring a current or a voltage produced by the power generation unit;

measuring a pressure of a working fluid;

receiving and condensing an expanded vapor stream into a liquid stream;

pressurizing the liquid stream; and vaporizing the liquid stream into a pressurized vapor stream.

4. The method of claim 1, wherein the controller is provided to the first and second expansion stages.

5. The method of claim 1, further comprising:

maintaining a predetermined relationship between the angle of the first inlet guide vane and the angle of the second inlet guide vane when adjusting the inlet pressure at the first expansion stage in the predetermined range and the predetermined relationship is:

$$A_2 = A_1 \cdot f(P_1, P_2, T_1, T_2),$$

where $A_1$ is an area of a fluid inlet unblocked by a vane at the first inlet guide vane, $A_2$ is an area of a fluid inlet unblocked by a vane at the second inlet guide vane, $P_1$ is a pressure of a working fluid at the first inlet guide vane, $P_2$ is a pressure of the working fluid at the second inlet guide vane, $T_1$ is a temperature of the working fluid at the first inlet guide vane, $T_2$ is a temperature of the working fluid at the second inlet guide vane, and f is a function.

6. The method of claim 1, further comprising:

maintaining a predetermined relationship between the angle of the first inlet guide vane and the angle of the second inlet guide vane when adjusting the inlet pressure at the first expansion stage in the predetermined range and the predetermined relationship is:

$$\frac{A_1}{A_{t1}} = \frac{A_2}{A_{t2}},$$

where $A_1$ is an area of a fluid inlet unblocked by a vane at the first inlet guide vane, $A_2$ is an area of a fluid inlet unblocked by a vane at the second inlet guide vane, $A_{t1}$ is a total area of the fluid inlet at the vane at the first inlet guide vane and $A_{t2}$ is a total area of the second fluid inlet at the vane at the second inlet guide vane.

7. The method of claim 1, further comprising:

maintaining a predetermined relationship between the angle of the first inlet guide vane and the angle of the second inlet guide vane when adjusting the inlet pressure at the first expansion stage in the predetermined range and the predetermined relationship is:

$$A_2 = A_1 \cdot \frac{\rho_1}{\rho_2} \cdot \sqrt{\frac{T_1}{T_2}},$$

where $A_1$ is an area of a fluid inlet unblocked by a vane at the first inlet guide vane, $A_2$ is an area of a fluid inlet unblocked by a vane at the second inlet guide vane, $\rho_1$ is a density of a working fluid at the first inlet guide vane, $\rho_2$ is a density of the working fluid at the second inlet guide vane, $T_1$ is a temperature of the working fluid at the first inlet guide vane, and $T_2$ is a temperature of the working fluid at the second inlet guide vane.

8. The method of claim 1, further comprising:

determining the highest power is performed by repeatedly adjusting the angle of the second inlet guide vane over a predetermined time period and measuring a power output of the power generation unit for each adjusted specific angle while maintaining constant the angle of the first inlet guide vane.

9. A system for power generation including a turboexpander with at least two expansion stages, each of the expansion stages of the turboexpander being drivingly connected to a power generation unit, the system comprising:
a controller configured to control (i) an angle of a first inlet guide vane provided at an inlet of a first expansion stage of the turboexpander for maintaining an inlet pressure of the first expansion stage in a predetermined range, and (ii) an angle of a second inlet guide vane provided at an inlet of a second expansion stage of the turboexpander for maintaining the inlet pressure at the first expansion stage in the predetermined range;
the controller being configured to vary the angle of the second inlet guide vane while maintaining fixed the angle of the first inlet guide vane and to determine a power generated by the power generation unit for corresponding varied angles; and
the controller being configured to determine a highest power from the determined power of the power generation unit and a corresponding angle of the second inlet guide vane and to adjust the angle of the second inlet guide vane independent of the angle of the first inlet guide vane to achieve the highest power.

10. The system of claim 9, further comprising:
the first expansion stage of the turboexpander which includes the first inlet guide vane;
the second expansion stage of the turboexpander which includes the second inlet guide vane; and
the power generation unit mechanically connected to the first and second expansion stages of the turboexpander.

11. The system of claim 9, wherein the power generation unit operates in a Rankine cycle system which uses an organic Rankine working fluid.

12. The system of claim 9, further comprising:
one or more sensors connected to the controller, provided at the power generation unit, and configured to measure a current or a voltage produced by the power generation unit;
one or more sensors connected to the controller, provided in the power generation system, and configured to measure a pressure of a working fluid;
a condenser fluidly connected to an outlet side of the turboexpander and configured to receive and condense an expanded vapor stream into a liquid stream;
a pump fluidly connected to an outlet side of the condenser configured to receive the liquid stream, to pressurize the liquid stream; and
a heat exchanger fluidly connected to an outlet side of the pump and configured to receive the pressurized liquid stream and vaporize the pressurized liquid stream into a pressurized vapor stream.

13. The system of claim 9, wherein the controller is provided to the first and second expansion stages.

14. The system of claim 9, wherein the controller is configured to maintain a predetermined relationship between the angle of the first inlet guide vane and the angle of the second inlet guide vane when adjusting the inlet pressure at the first expansion stage in the predetermined range and the predetermined relationship is:

$$A_2 = A_1 \cdot f(P_1, P_2, T_1, T_2),$$

where $A_1$ is an area of a fluid inlet unblocked by a vane at the first inlet guide vane, $A_2$ is an area of a fluid inlet unblocked by a vane at the second inlet guide vane, $P_1$ is a pressure of a working fluid at the first inlet guide vane, $P_2$ is a pressure of the working fluid at the second inlet guide vane, $T_1$ is a temperature of the working fluid at the first inlet guide vane, $T_2$ is a temperature of the working fluid at the second inlet guide vane, and f is a function.

15. The system of claim 9, wherein the controller is configured to maintain a predetermined relationship between the angle of the first inlet guide vane and the angle of the second inlet guide vane when adjusting the inlet pressure at the first expansion stage in the predetermined range and the predetermined relationship is:

$$\frac{A_1}{A_{t1}} = \frac{A_2}{A_{t2}},$$

where $A_1$ is an area of a fluid inlet unblocked by a vane at the first inlet guide vane, $A_2$ is an area of a fluid inlet unblocked by a vane at the second inlet guide vane, $A_{t1}$ is a total area of the fluid inlet at the vane at the first inlet guide vane and $A_{t2}$ is a total area of the second fluid inlet at the vane at the second inlet guide vane.

16. The system of claim 9, wherein the controller is configured to maintain a predetermined relationship between the angle of the first inlet guide vane and the angle of the second inlet guide vane when adjusting the inlet pressure at the first expansion stage in the predetermined range and the predetermined relationship is:

$$A_2 = A_1 \cdot \frac{\rho_1}{\rho_2} \cdot \sqrt{\frac{T_1}{T_2}},$$

where $A_1$ is an area of a fluid inlet unblocked by a vane at the first inlet guide vane, $A_2$ is an area of a fluid inlet unblocked by a vane at the second inlet guide vane, $\rho_1$ is a density of a working fluid at the first inlet guide vane, $\rho_2$ is a density of the working fluid at the second inlet guide vane, $T_1$ is a temperature of the working fluid at the first inlet guide vane, and $T_2$ is a temperature of the working fluid at the second inlet guide vane.

17. The system of claim 9, wherein determining the highest power is performed by repeatedly adjusting the angle of the second inlet guide vane over a predetermined time period and measuring a power output of the power generation unit for each adjusted specific angle while maintaining constant the angle of the first inlet guide vane.

* * * * *